(12) United States Patent
Fenton

(10) Patent No.: US 6,766,663 B2
(45) Date of Patent: Jul. 27, 2004

(54) I.S. MACHINE

(75) Inventor: Frank Alan Fenton, Granby, CT (US)

(73) Assignee: Emhart Glass S.A., Cham (CH)

( * ) Notice: Subject to any disclaimer, the term of this patent is extended or adjusted under 35 U.S.C. 154(b) by 480 days.

(21) Appl. No.: 09/964,123

(22) Filed: Sep. 25, 2001

(65) Prior Publication Data

US 2003/0056543 A1 Mar. 27, 2003

(51) Int. Cl.$^7$ .............................. C03B 9/44; C03B 11/00
(52) U.S. Cl. .............................. 65/165; 65/159; 65/168
(58) Field of Search ............................... 65/28, 79, 159, 65/165, 168

(56) References Cited

U.S. PATENT DOCUMENTS

| | | | | |
|---|---|---|---|---|
| 1,766,979 A | * | 6/1930 | Canfield | 65/229 |
| 4,343,644 A | * | 8/1982 | Hullen et al. | 65/241 |
| 4,349,368 A | * | 9/1982 | Hullen et al. | 65/28 |
| 4,612,032 A | * | 9/1986 | Nebelung | 65/165 |
| 5,895,513 A | * | 4/1999 | Ciriello et al. | 65/159 |

* cited by examiner

Primary Examiner—Sean Vincent
(74) Attorney, Agent, or Firm—Spencer T. Smith

(57) ABSTRACT

A parison chute assembly for an I.S. machine. The assembly has a chute which is rotatably supported at one end and is displaceable from an out of the way position above the horizontal down to a vertical position for receiving gobs.

4 Claims, 2 Drawing Sheets

I.S. MACHINE

The present invention relates to I.S. (individual section) machines which transform gobs of molten glass into bottles in a two step process.

BACKGROUND OF THE INVENTION

An I.S. (individual section) machine has a plurality of identical sections (a section frame in which and on which are mounted a number of section mechanisms) each of which has a blank station which receives one or more gobs of molten glass and forms them into parisons having a threaded opening at the bottom (the finish) and a blow station which receives the parisons and forms them into bottles standing upright with the finish at the top.

During machine start up, the parisons formed in the blank station are not fit for further processing in the blow molds and must be removed from the machine. An operator conventionally must grab the parisons and remove them from the section. This puts the operator face to face with molten glass parisons until the blank side has heated up sufficiently to form parisons which can be formed into bottles at the blow station. This is a very undesirable period of time for the operator.

In the early 80's a prototype variation of an I.S. machine was built which had a rotating blow mold assembly which had two blow mold stations which sequentially received parisons from a single blank mold. This concept is shown in U.S. Pat. No. 4,343,644. In that machine parisons could be dumped by positioning the invert at a 900 orientation and dropping the parisons into a parison catching device which is lowered into position extending partially over the invert and which discharges the parisons into a cullet chute having an opening defined in the top of the section (see U.S. Pat. No. 4,612,032) large enough to accept vertically oriented parisons.

OBJECT OF THE INVENTION

It is an object of the present invention to provide an improved system for removing parisons from an I.S. machine.

BRIEF DESCRIPTION OF THE DRAWINGS

Referring to the drawings.

BRIEF DESCRIPTION OF THE PREFERRED EMBODIMENT

Figure 1:
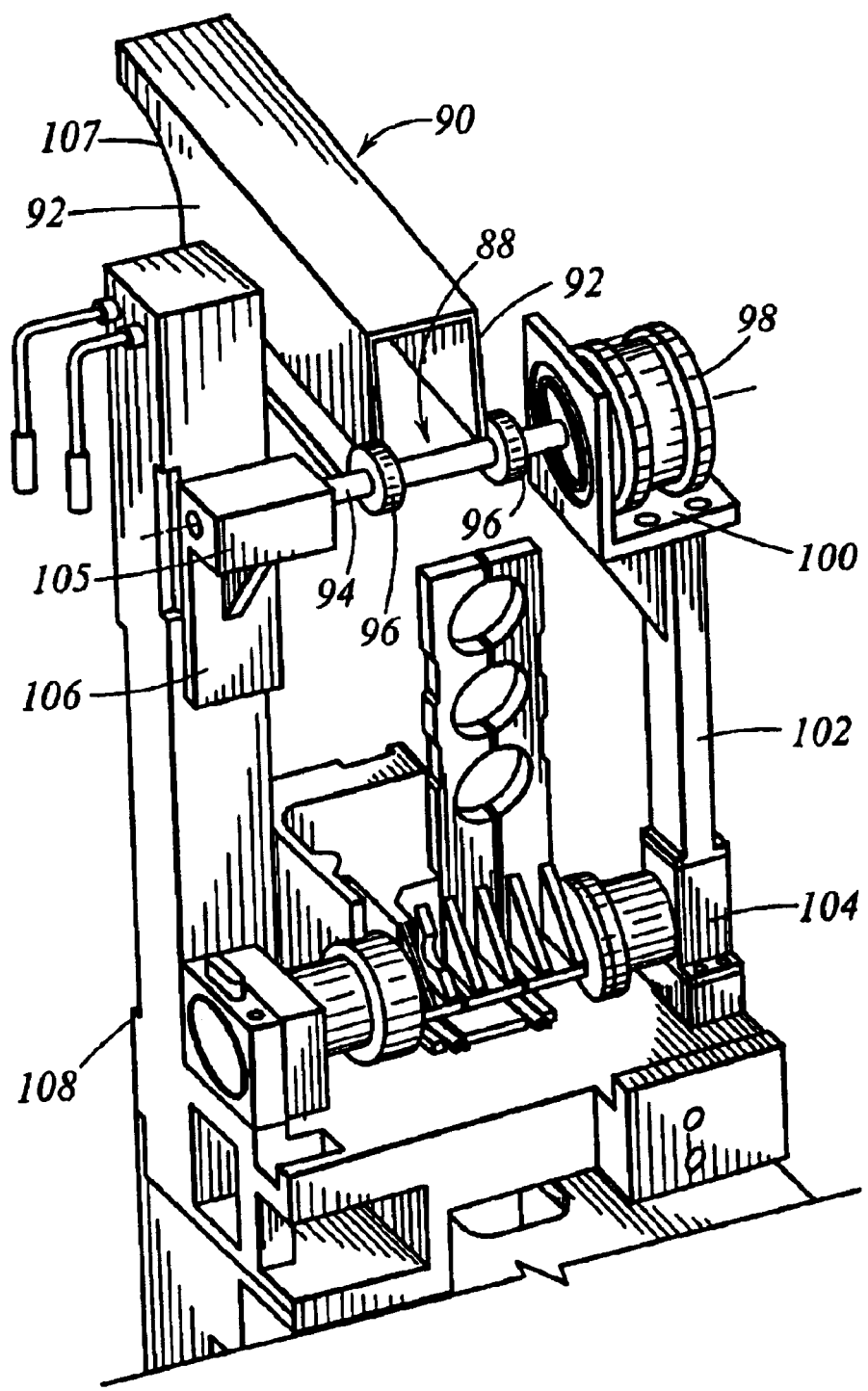
FIG. 1 is an oblique view of a parison chute mechanism for an I.S. machine made in accordance with the teachings of the present invention with the parison chute at the retracted position.

An automated parison chute assembly 88 (FIG. 1) includes a parison chute in the form of an elongated trough or channel 90 which has opposed side walls 92. A support shaft 94 is keyed to support pads 96 secured to the top of each sidewall at one end of the chute so that rotation of the shaft will effect rotation of the chute. The shaft may be the output shaft of a servo motor 98. The servo motor is secured to a mounting bracket 100 and the mounting bracket is supported by a strut 102 secured to the invert housing 104. The free end of the shaft is rotatably supported by a suitable bearing (not shown) which is supported within a bearing block 105 which is integral with a bracket 106 secured to any vertical strut or the like extending upwardly from the invert housing (which in the disclosed embodiment is the housing 108 of an invert drive—see U.S. patent application Ser. No. 09/672,551 for details). The free ends of the parison chute side walls are cut out 107 to eliminate interference between the walls and the invert housing when the parison chute is at the down position.

Figure 2:
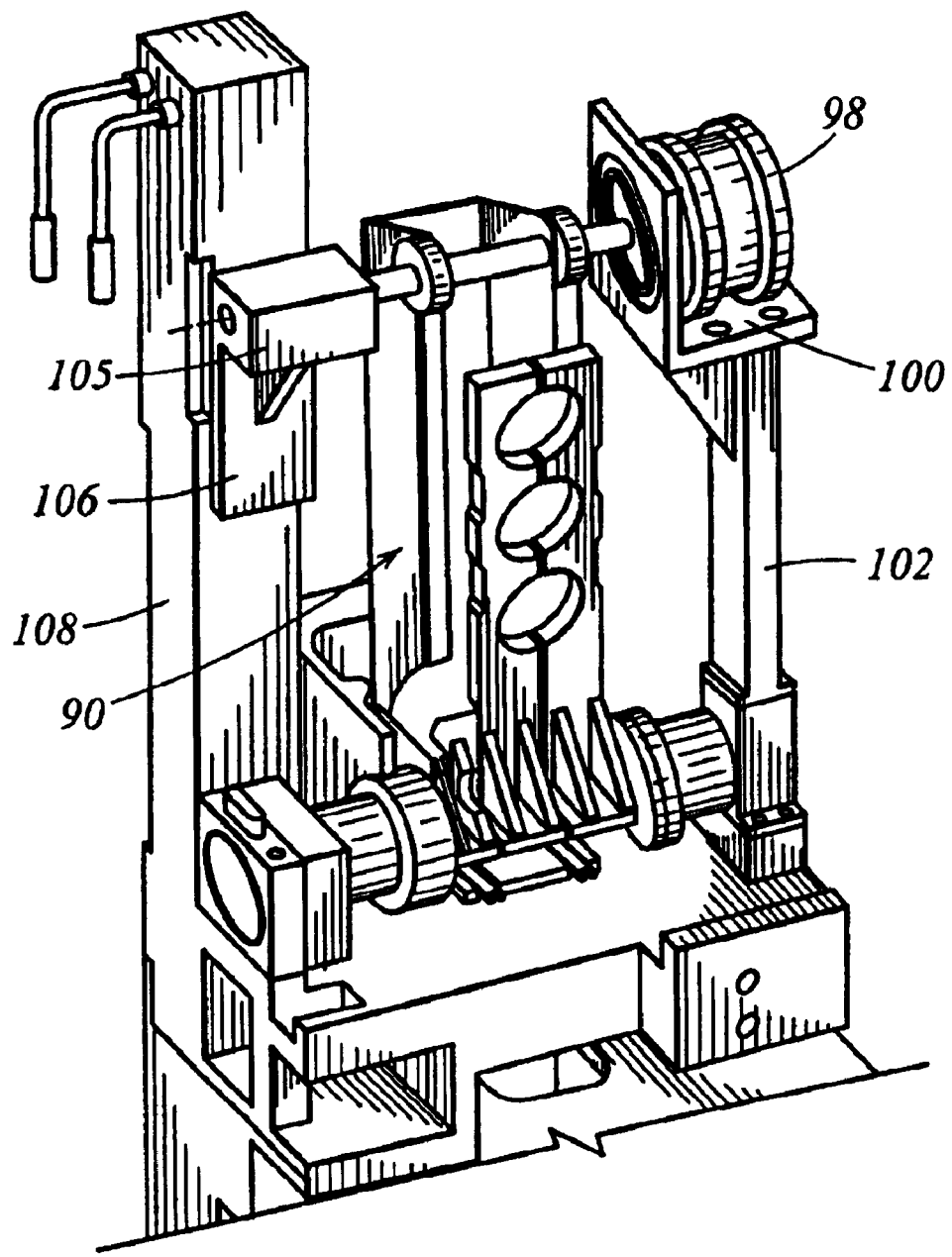
FIG. 2 is a view similar to that of FIG. 1 with the parison chute at the advanced position.

The parison chute can be displaced from a retracted position shown in FIG. 1 approximately 130° to the vertical advanced position shown in FIG. 2. This movement will occur while the blow molds are held in the open position. As shown in FIGS. 1 and 2, the neck ring arms can be displaced between the blank station and the blow station when the parison chute is at the retracted position. When parisons are to be removed, the blow molds are held at the open position, the parison chute is displaced to the advanced position and the neckrings which are closed about the finish portion of a formed parison are displaced to a vertical orientation (FIG. 2) and at this orientation or slightly before, the neck ring arms are opened to release the parisons into the parison chute for delivery to the central hole.

What is claimed is:

1. A parison deflector mechanism for an I.S. machine comprising an elongated deflector chute, shaft means secured to one end of said elongated deflector chute, motor means for rotating said shaft means to rotatively displace the elongated deflector chute from an elevated position to a vertical down position, and support means for supporting said shaft means.

2. A parison deflector mechanism for an I.S. machine according to claim 1, wherein said shaft means is the output of said motor means.

3. A parison deflector mechanism for an I.S. machine according to claim 2, wherein said I.S. machine includes an invert mechanism including a housing and said support means includes a pair of vertical strut means extending upwardly from said invert housing.

4. A parison deflector mechanism for an I.S. machine according to claim 3, wherein said invert mechanism includes drive means having a vertically extending housing and the vertically extending drive means housing comprises one of said vertical strut means.

* * * * *